July 18, 1933.  W. F. PRIEST  1,918,864
DIFFERENTIAL MECHANISM
Filed March 13, 1933  2 Sheets-Sheet 1
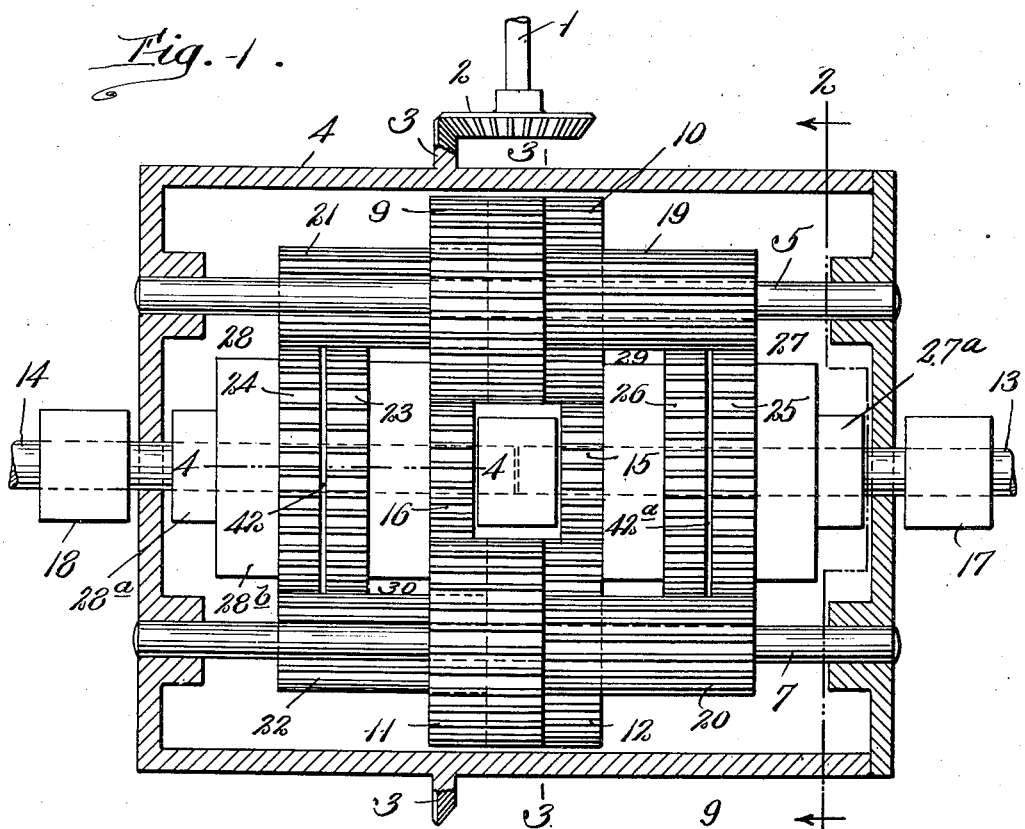
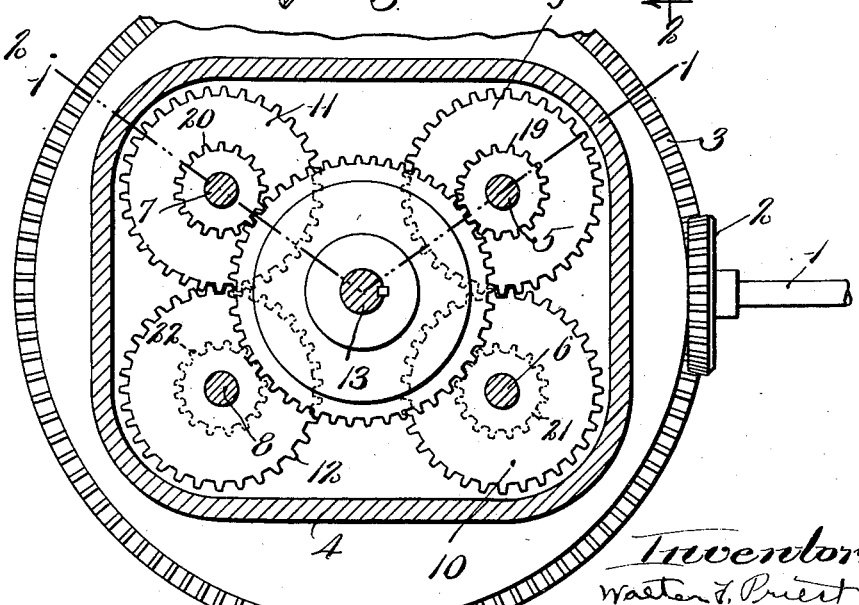
Inventor
Walter F. Priest
by George A. Rockwell
Atty.

July 18, 1933.  W. F. PRIEST  1,918,864
DIFFERENTIAL MECHANISM
Filed March 13, 1933   2 Sheets-Sheet 2
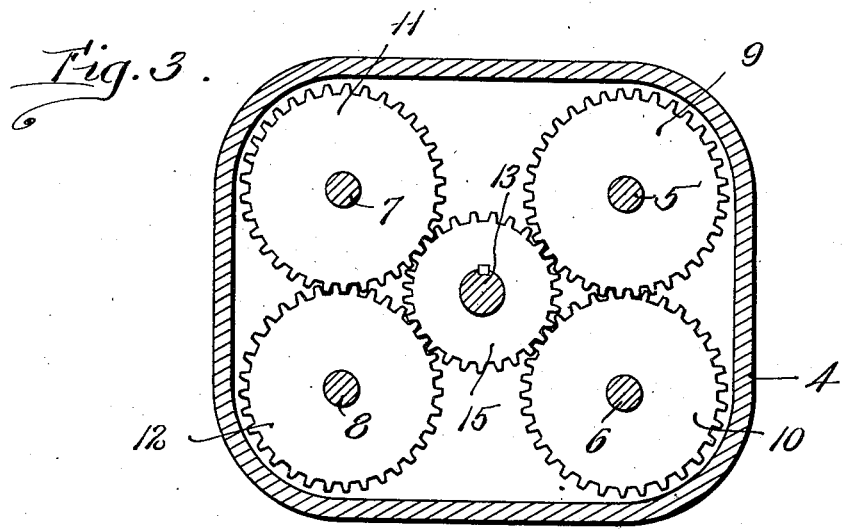
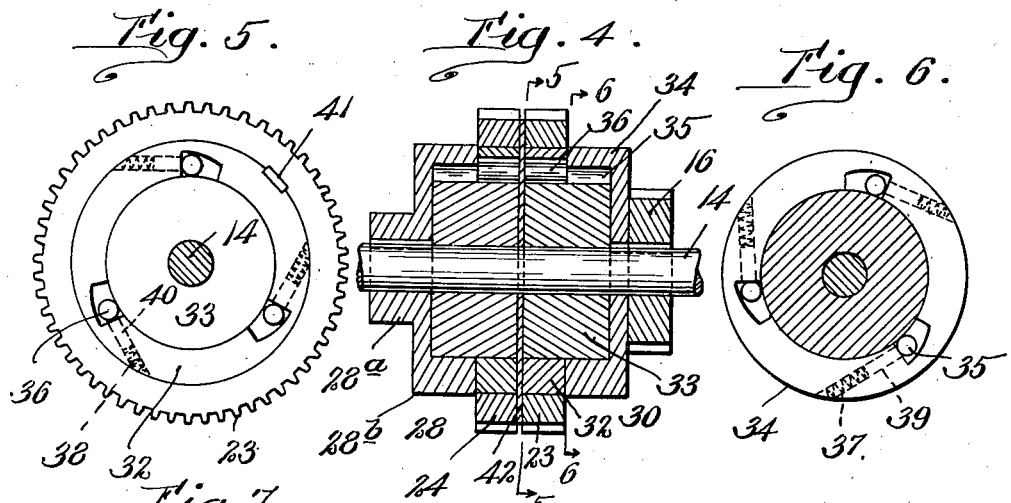
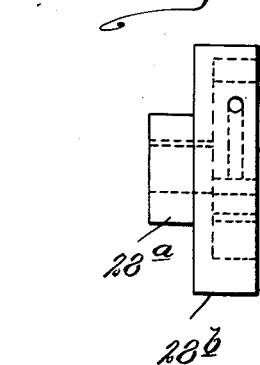

Patented July 18, 1933

1,918,864

UNITED STATES PATENT OFFICE

WALTER F. PRIEST, OF ARLINGTON, MASSACHUSETTS

DIFFERENTIAL MECHANISM

Application filed March 13, 1933. Serial No. 660,467.

The principal object of my invention is to provide a differential mechanism which is efficient in operation and simple in construction.

Another object, in case my invention is used with automobiles, is to get a positive drive on both wheels at all times even if those wheels are moving at different speeds, this being particularly advantageous compared with prior mechanisms in which one wheel may spin as in mud or on ice.

Other objects will be pointed out below.

A feature of my invention is a positive drive differential, preferably fully automatic.

Another feature is the combination of a differential mechanism with two driving members for one direction or with four driving members for two directions.

Another feature is a driving unit which may be used by itself without the ordinary differential mechanism to drive an element in one direction but permitting said element to move in two directions when disengaged from said unit.

Other features will be pointed out below.

In the drawings

Figure 1 is a plan section of a device embodying my invention on line 1—1 of Figure 2;

Figure 2 is a section on line 2—2 of Figure 1;

Figure 3 is a section on line 3—3 of Figure 1;

Figure 4 is a section on line 4—4 of Figure 1;

Figure 5 is a section of one of the driving units, hereinafter described, on line 5—5 in Figure 4;

Figure 6 is a section of a portion of the driving unit, hereinafter described, on line 6—6 of Figure 4;

Figure 7 is a side elevation showing parts 28ª and 28ᵇ, described below; and

Figure 8 is a side elevation showing gear 24 and a driving center similar to driving center 33, described below.

I show my invention embodied in a vehicle although it is useful in many other locations and for other purposes.

Driving shaft 1 carries bevel gear 2 meshing with bevel gear 3 on differential case 4, within which is suitably mounted differential mechanism including shafts 5 and 6 and shafts 7 and 8, all of said shafts being suitably mounted in case 4, said shafts being fixed respectively to gears 9, 10, 11 and 12, and including shafts 13 and 14, fixed respectively to gears 15 and 16, these latter shafts being the main driven shafts, and, in the case of vehicles, are fixed to wheels (not shown) which are to engage a roadway, 17 and 18 representing bearings for shafts 13 and 14 respectively.

My additional gears 19 and 20 are fixed respectively to shafts 5 and 7 and my additional gears 21 and 22 are fixed respectively to shafts 6 and 8, these gears 19 to 22 meshing with additional drive members 23, 24, 25 and 26, which, in the form shown, are gears, not directly attached to shafts 13 and 14 but which drive shafts 13 and 14 through driving units 27 and 28, similar units 29 and 30 acting in the reverse direction and not being directly attached to shafts 13 and 14 but acting to drive shafts 13 and 14.

The driving unit 30 comprises gearing 23, and driving centers 32, 33 and 34 and ordinary driving pins 35 and 36 actuated by springs 37 and 38 and plungers 39 and 40.

The driving center 34 is keyed to shaft 14, the driving center 33 being free to revolve on shaft 14 and also freely within driving center 34. The driving center 32 is free to revolve on center 33 and is keyed at 41 to gear 23.

The driving units 28, 29 and 27 are of the same general construction as driving unit 30 except that units 28 and 27 have hubs such as 28ª and 27ª while units 30 and 29 have gears 15 and 16 keyed to shafts 13 and 14.

Spacer plate 42 is freely mounted on shaft 14 and spaces units 28 and 30 and also prevents pins such as 36 on unit 30 from interfering with similar pins or unit 28. Spacer plate 42ª similarly spaces units 27 and 29.

The pitch diameters, in the form shown, are as follows: gears 15 and 16 are 3½ inches; gears 9 to 12 are 4½ inches; gears 19 to 22 are 2 inches; and gears 23 to 26 are 6 inches.

In using my mechanism I shall assume that pinion 2 is driving gear 3 and gear case 4 at 100 R. P. M. which in turn drives both shafts 14 and 13 at the same speed if the traction of both wheels are the same. Now if the wheel on shaft 14 is held or loses its traction for a second or so, gears 9, 10, 11, 12, 19, 20, 21 and 22 start turning. I will assume for this calculation that shaft 14 has stopped. This makes gears 9, 11, 19 and 20 run at plus 177 R. P. M. due to their gear ratio, and this turns gears 10, 12, 21 and 22 at the same speed, but in the minus direction, which in turn revolves gear 15 and shaft 13 at plus 200 R. P. M. due to having the same gear ratio. Gears 23 and 24, being part of the several parts as explained and in mesh with gears 21 and 22, immediately force driving pins 35 and 36 of gear 23 into their driving position which drives shaft 14 at plus 125 R. P. M. due to its gear ratio, and gear 24 is free to revolve as its driving pins are for the reverse direction. Gear 26 is driven at plus 75 R. P. M. but it must be remembered that shaft 13 is running at 200 R. P. M. and therefore there must be some means to allow shaft 13 to run without any interference. Pins 36 are forced out of their driving position due to the direction of rotation and allow shaft 13 to run free. The driving pins of gear 25 are set for the opposite direction so this gear 25 is free to revolve. Therefore shaft 14 is running at about one half the speed of shaft 13 which is plenty of speed difference for turning corners, etc. Gears 25 and 24 are for the reverse direction. The same speed ratio holds true for them and the unit will also work from shaft 14 to shaft 13, or shaft 13 to shaft 14.

The driving units 27 and 28 automatically and positively drive either shaft 13 or 14 in one direction when driven by gears 19 to 22 and the driving units 29 and 30 automatically and positively drive either shaft 13 or shaft 14 in the opposite direction when driven by said gears 19 to 22.

Among the advantages of my invention I may point out that it is workable in both directions without any manual operating levers or outside locking devices; that it is simple in construction; that the speed ratios are such that it gives the driving members a mechanical advantage because the driving is from a smaller gear to a larger gear; that all gears are on the regular differential shafts and no extra jack shaft is required; that the unit also allows free range of the differential for retarding the car on down grades, etc.; and that it helps to prevent skidding if wheels are used and to give the driving power at all times for wheels or other members operated by shafts 13 and 14.

A further important advantage is that with my driving unit by itself the driving is from the outside, as, for example, from gear 23 to shaft 14 at the inside, and any attempt to drive from the inside, as, for example, from shaft 14 would be without effect in either direction.

What I claim is:

1. A mechanism of the character described comprising a pair of movable members; differential mechanism connecting said members; and automatic means to drive said members positively at all times, whether said members move at the same speed or at different speeds, said automatic means including a driving unit which comprises a driven member, driving means, a driving center member, driving means, a driving center adapted to operatively engage a shaft, another driving center mounted to rotate freely on said shaft and freely within the first-mentioned driving center and a third driving center free to revolve on said other driving center and being operatively connected to said driven member.

2. A driving unit comprising a driven member; driving pins; a driving center adapted to operatively engage a shaft; another driving center mounted to rotate freely on said shaft and freely within the first-mentioned driving center; and a third center free to revolve on said other driving center and being operatively connected to said driven member.

3. A mechanism of the character described comprising a pair of shafts; differential mechanism connecting said shafts; and two driving units, one to drive one of said shafts in one direction, and the other to drive the other of said shafts in the same direction, each driving unit comprising a driven member operatively connected with one of said shafts, driving pins, a driving center operatively engaging said one shaft, another driving center mounted to rotate freely on said shaft and freely within the first-mentioned driving center and a third driving center free to revolve on said other driving center and being operatively connected to said driven member.

4. A mechanism of the character described comprising a pair of shafts; differential mechanism connecting said shafts, two driving units, one to drive one of said shafts in one direction and the other to drive the other of said shafts in the same direction; and two other driving units, one to drive one of said shafts in the reverse direction and the other to drive the other of said shafts in the reverse direction; each of said four driving units comprising a driven member operatively connected with one of said shafts, driving pins, a driving center operatively engaging said shaft, another driving center mounted to rotate freely on said shaft and freely within the first-mentioned driving center and a third driving center free to revolve on said other driving center and being operatively connected to said driven member.

5. A mechanism of the character described comprising a pair of rotary members; differential mechanism connecting said members; a rotary casing for said differential mechanism; and means to drive said members positively at all times, whether said members move at the same speed or at different speeds and whether said members move in one direction or in the opposite direction, said means including gearing within said casing, all of the gears within said casing having their axes parallel with the axis of said rotary members.

6. A mechanism of the character described comprising a pair of rotary members; differential mechanism connecting said members; a rotary casing for said differential mechanism; and automatic means to drive said members positively at all times, whether said members move at the same speed or at different speeds and whether said members move in one direction or in the opposite direction, said means including gearing within said casing, all of the gears within said casing having their axes parallel with the axis of said rotary members.

7. A driving unit comprising a driven member; driving means; a driving center adapted to operatively engage a shaft; another driving center mounted to rotate freely on said shaft and freely within the first-mentioned driving center; and a third driving center free to revolve on said other driving center and being operatively connected to said driven member.

WALTER F. PRIEST.